M. BLOCK.
ROD CLAMP.
APPLICATION FILED JAN. 22, 1916.
1,181,565. Patented May 2, 1916.
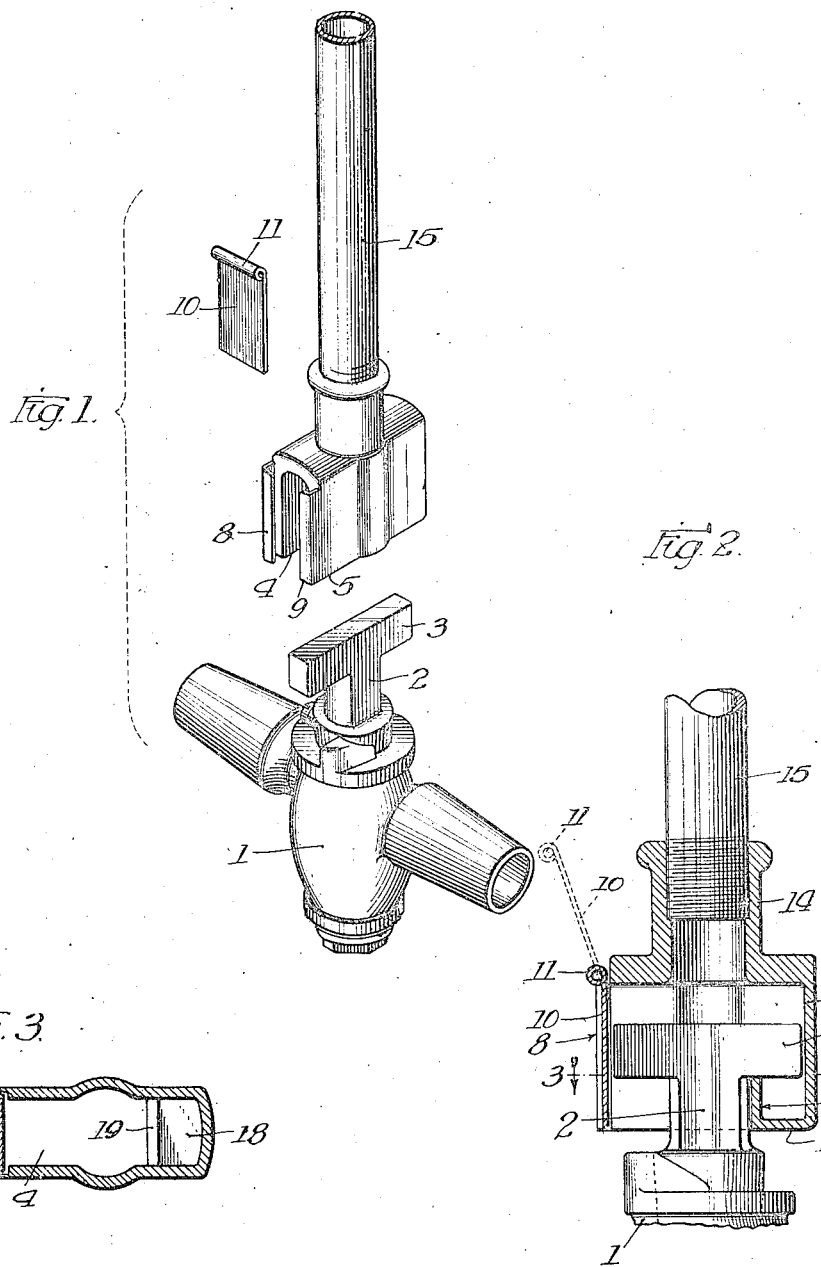

UNITED STATES PATENT OFFICE.

MANDEL BLOCK, OF CHICAGO, ILLINOIS.

ROD-CLAMP.

1,181,565.  Specification of Letters Patent.  Patented May 2, 1916.

Application filed January 22, 1916. Serial No. 73,764.

*To all whom it may concern:*

Be it known that I, MANDEL BLOCK, a citizen of the United States, residing at Chicago, in the county of Cook and State of Illinois, have invented a certain new and useful Improvement in Rod-Clamps, of which the following is a specification.

My invention relates to rod clamps, more particularly of the type commonly employed in underground plumbing. It will be understood by those familiar with the art that the service pipes leading from street water mains to residences and stores are usually placed underground about three feet deep, or deep enough to avoid freezing under ordinary conditions. Shut-off valves are provided in these service pipes and these valves are normally operated by rods which rise to the surface, either through the ground or through a suitable pipe, box or conduit. As ordinarily installed the parts are exposed to the action of moisture which causes the parts to rust. In consequence the clamps, being usually made of iron, frequently either disintegrate or break when pressure is applied to turn the valve. When this occurs in the ordinary installation, it becomes necessary to dig down and uncover the valve, remove the old clamp and set a new one. Digging is usually necessary even in cases where the rod is incased in a box or housing, because with the type of clamps heretofore in use a good deal of space is necessary for the manipulation of the clamp; in other words, under ordinary circumstances there is not sufficient room for the plumber to reach down, detach the old clamp and attach the new one. Sometimes it is necessary to make the attachment beneath several inches of water.

The object of my invention is to provide a clamp of such character that it may be adjusted to a shut-off valve with great ease; in fact, it is my purpose to provide a clamp which may be regarded as semi-automatic in its action and applicable even where out of actual reach by the plumber and even out of his view.

I accomplish my object by the construction illustrated in the accompanying drawings, in which—

Figure 1 is a perspective view of the rod clamp and of a valve of the type which the clamp is adapted to operate. This figure also shows the cover plate adapted to lock the clamp on to the head of the valve. Fig. 2 shows the clamp in axial section and shows the head of the valve in position within the clamp. Fig. 3 is a plan section on the line 3—3, Fig. 2.

Similar numerals refer to similar parts throughout the several views.

The valve shown is of the standard type having a casing 1 and a head composed of a stem portion 2 and cross arm 3. The clamp consists of a housing having two approximately parallel side walls 4, 5, located at a sufficient distance apart to loosely receive the cross arm of the valve between them. The housing is closed at one end by a wall 6, the opposite end being open but provided with side guides 8, 9 for receiving and retaining the slip cover 10. This cover is shown in perspective in the upper portion of Fig. 1 and is provided with a boss 11 at the upper end which acts as a stop to limit the descent of the cover. A cylindrical boss 14 is formed at the top of the housing and this is internally screw-threaded to receive the lower threaded end of the rod 15. It will be understood that the rod will ordinarily be three or four feet long so that it may extend to the surface of the ground where it may be reached by the person desiring to turn the valve on or off. The housing is open at the bottom except near the wall 6 where a ledge 18 is formed as shown in Figs. 2 and 3. This ledge or partial bottom is, in the present case, furnished with an upturned flange 19, at the inner edge.

In operation, when it is desired to apply the clamp to the valve, the cover 10 is removed, thus making it possible to slip the clamp down over the valve head and then toward the left (Fig. 2) so as to bring one end of the cross arms 3 over the ledge 18, 19. The cover is then dropped into position, where gravity will keep it closed. When the cover is thus applied the clamp will remain firmly locked in place and will enable the operator to operate the valve. The clamp may be released at any time by simply withdrawing the cover and disengaging the clamp from the valve head.

In case it becomes necessary for the operator to operate in a restricted space where he cannot reach down to adjust the cover he may proceed by setting the cover in the position shown in dotted lines; Fig. 2. In this position the cover rests lightly near the top of the slot and being slightly tilted, will produce sufficient friction between its lower end and the sides of the guides 10 to hold the cover in this position during the act of lowering the clamp on to the valve head. By using reasonable care to prevent the cover from being jarred from its position the operator may adjust the clamp to the valve head and then, by rapping upon the rod 15 or otherwise shaking the device a trifle, cause the cover to slip down from the position shown in dotted lines to the closed position shown in full lines, Fig. 2. My device may be regarded, therefore, as semi-automatic in its operation, for it is not necessary that the operator close the cover by hand when the clamp is being applied to the valve head.

When it is desired to remove the clamp from the valve head, the result may be easily accomplished by either withdrawing the cover by hand or by lowering a hooked wire or other suitable implement alongside of the rod and causing it to engage either the boss 11 on the cover or the lower edge of the cover and then pulling upward to raise the cover sufficiently to release the valve head. No twisting of the wires is required with my device and on account of the design there is little danger that the parts can become rusted together.

Another advantage accruing from my construction is that the clamp forms practically a complete housing for the valve head and thus prevents sand and grit from entering the housing and clogging the same or otherwise preventing the free operation of the device. The design of the clamp is simple and lends itself readily to being formed of a single piece of cast metal.

Having thus described my invention what I claim as new and desire to secure by Letters Patent, is—

1. A rod clamp having approximately parallel walls open at the bottom for the most part, a portion of the bottom, near one end, being closed, and means for preventing endwise movement of the clamp.

2. A rod clamp having substantially parallel walls open at one end, the walls being open at the bottom for the most part, there being a cross element formed at the bottom near one end, said cross element extending from one of said walls to the other, and means for closing the opening at the open end of the walls.

3. A rod clamp having approximately parallel walls, open at one end and closed at the other, and open partway across the bottom and closed partway across the bottom, and means for closing the open end of the walls.

4. A rod clamp having side walls disposed approximately parallel to each other for retaining a valve head between them, said walls being open at the bottom for the most part, and open at one end, vertical guides formed in the side walls alongside of the opening at the open end of the device, a cover adapted to be removably held within said guides, and a ledge near one end of the bottom of the device extending from one of said walls to the other.

5. A rod clamp having side walls arranged approximately parallel, said walls being open at the bottom for the most part and open at one end, vertical guides formed in the side walls alongside of the opening at the end of the device, a cover adapted to slip into said guides, and a cross element extending from one of said side walls to the other, near the end of the device opposite to the cover, said guides being of a thickness somewhat greater than the thickness of the cover and the guides being open at the upper end whereby, by tilting the cover slightly, it may be temporarily held by friction near the upper end of the guides.

In witness whereof, I have hereunto subscribed my name.

MANDEL BLOCK.